US011893351B2

United States Patent
Sar Shalom et al.

(10) Patent No.: US 11,893,351 B2
(45) Date of Patent: *Feb. 6, 2024

(54) MODIFIED MACHINE LEARNING MODEL AND METHOD FOR COHERENT KEY PHRASE EXTRACTION

(71) Applicant: Intuit Inc., Mountain View, CA (US)

(72) Inventors: Oren Sar Shalom, Nes Ziona (IL); Yehezkel Shraga Resheff, Jerusalem (IL)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,153

(22) Filed: Aug. 22, 2022

(65) Prior Publication Data
US 2022/0405476 A1    Dec. 22, 2022

Related U.S. Application Data

(63) Continuation of application No. 16/805,688, filed on Feb. 28, 2020, now Pat. No. 11,436,413.

(51) Int. Cl.
*G06F 40/289*    (2020.01)
*G06F 17/18*    (2006.01)
*G06N 20/00*    (2019.01)

(52) U.S. Cl.
CPC ............ *G06F 40/289* (2020.01); *G06F 17/18* (2013.01); *G06N 20/00* (2019.01)

(58) Field of Classification Search
None
See application file for complete search history.

(56) References Cited

U.S. PATENT DOCUMENTS

| 9,122,747 B2 * | 9/2015 | Inagaki ............... G06F 16/3347 |
| 2015/0127594 A1 * | 5/2015 | Parada San Martin ..................... G10L 15/16 706/16 |
| 2020/0273447 A1 * | 8/2020 | Zhou ..................... G10L 15/148 |
| 2021/0004439 A1 * | 1/2021 | Xiong ................... G06F 40/284 |

OTHER PUBLICATIONS

Turney, P., "Coherent Keyphrase Extraction via Web Mining", Proceedings of the Eighteenth International Joint Conference on Artificial Intelligence, Aug. 9-15, 2003, 7 pages.

* cited by examiner

*Primary Examiner* — Quynh H Nguyen
(74) *Attorney, Agent, or Firm* — FERGUSON BRASWELL FRASER KUBASTA PC

(57) ABSTRACT

A method including receiving, in a machine learning model (MLM), a corpus including words. The MLM includes layers configured to extract keywords from the corpus, plus a retrospective layer. A first keyword and a second keyword from the corpus are identified in the layers. The first and second keywords are assigned first and second probabilities. Each probability is a likelihood that a keyword is to be included in a key phrase. A determination is made, in the retrospective layer, of a first probability modifier that modifies the first probability based on a first dependence relationship between the second keyword being placed after the first keyword. The first probability is modified using the first probability modifier. The first modified probability is used to determine whether the first keyword and the second keyword together form the key phrase. The key phrase is stored in a non-transitory computer readable storage medium.

18 Claims, 6 Drawing Sheets

US 11,893,351 B2

MODIFIED MACHINE LEARNING MODEL AND METHOD FOR COHERENT KEY PHRASE EXTRACTION

RELATED APPLICATIONS

This application is a continuation application of U.S. patent application Ser. No. 16/805,688, filed Feb. 28, 2020, the entirety of which is hereby incorporated by reference.

BACKGROUND

Key phrases may be used to categorize a corpus. A corpus, as used herein, is two or more natural language words in a single document. In many cases, a corpus includes many, perhaps thousands of words, or more. Thus, improved techniques are sought for using machine learning models, sometimes referred-to as artificial intelligence, to automatically identify key phrases within a corpus. The automatically identified key phrases may then be used to automatically categorize the corpus in order to better organize the corpus within a document management system or data storage unit.

SUMMARY

The one or more embodiments provide for a method. The method includes receiving, in a machine learning model, a corpus including words of natural language terms. The machine learning model includes layers configured to extract keywords out of the corpus and further includes a retrospective layer. The method also includes identifying, in the layers, a first keyword from the corpus and a second keyword from the corpus. The method also includes assigning the first keyword a first probability and the second word a second probability. Each probability is a corresponding likelihood that a corresponding keyword is to be included in a key phrase. The method also includes determining, in the retrospective layer, a first probability modifier that modifies the first probability based on a first dependence relationship between the second keyword being placed after the first keyword. The method also includes modifying the first probability using the first probability modifier to form a first modified probability. The method also includes using the first modified probability to determine whether the first keyword and the second keyword together form the key phrase. The method also includes storing the key phrase in a non-transitory computer readable storage medium.

The one or more embodiments also provide for a method of training a machine learning model. The method includes receiving a corpus including natural language words. The natural language words are organized into known key phrases. The method also includes inputting at least part of the corpus as a vector into the machine learning model. The machine learning model includes a layers and a retrospective layer. The method also includes determining, using the layers, a probability that a first word in the corpus is a first keyword in at least one of multiple predicted key phrases. The method also includes determining, using the retrospective layer, a first modified probability that the first word is the first keyword based on a first position of the first word relative to a second position of a second word in the corpus. The method also includes determining, using the machine learning model, the predicted key phrases. At least one of the predicted key phrases includes at least the first word. The method also includes calculating a loss function by comparing and evaluating a difference between the predicted key phrases and the known key phrases. The method also includes modifying the machine learning model using the loss function.

The one or more embodiments also includes a classification system. The classification system includes a data repository. The data repository stores a corpus including words including a first word. The data repository also stores a machine learning model having layers and a retrospective layer. The data repository also stores a key phrase including a subset of words within the words. The data repository also stores a first probability that the first word is a keyword in the key phrase. The data repository also stores a modified probability that the first word is the keyword. The modified probability is based on a position of the first word relative to at least one neighbor word in the corpus. The classification system also includes a server including a server application. The server application is configured to execute the machine learning model to calculate the first probability using the layers and to calculate the modified probability using the retrospective layer. The server application is further application is further configured to predict that the first word is part of the key phrase when the modified probability exceeds a threshold value.

Other aspects of the invention will be apparent from the following description and the appended claims.

DETAILED DESCRIPTION

Figure 1:
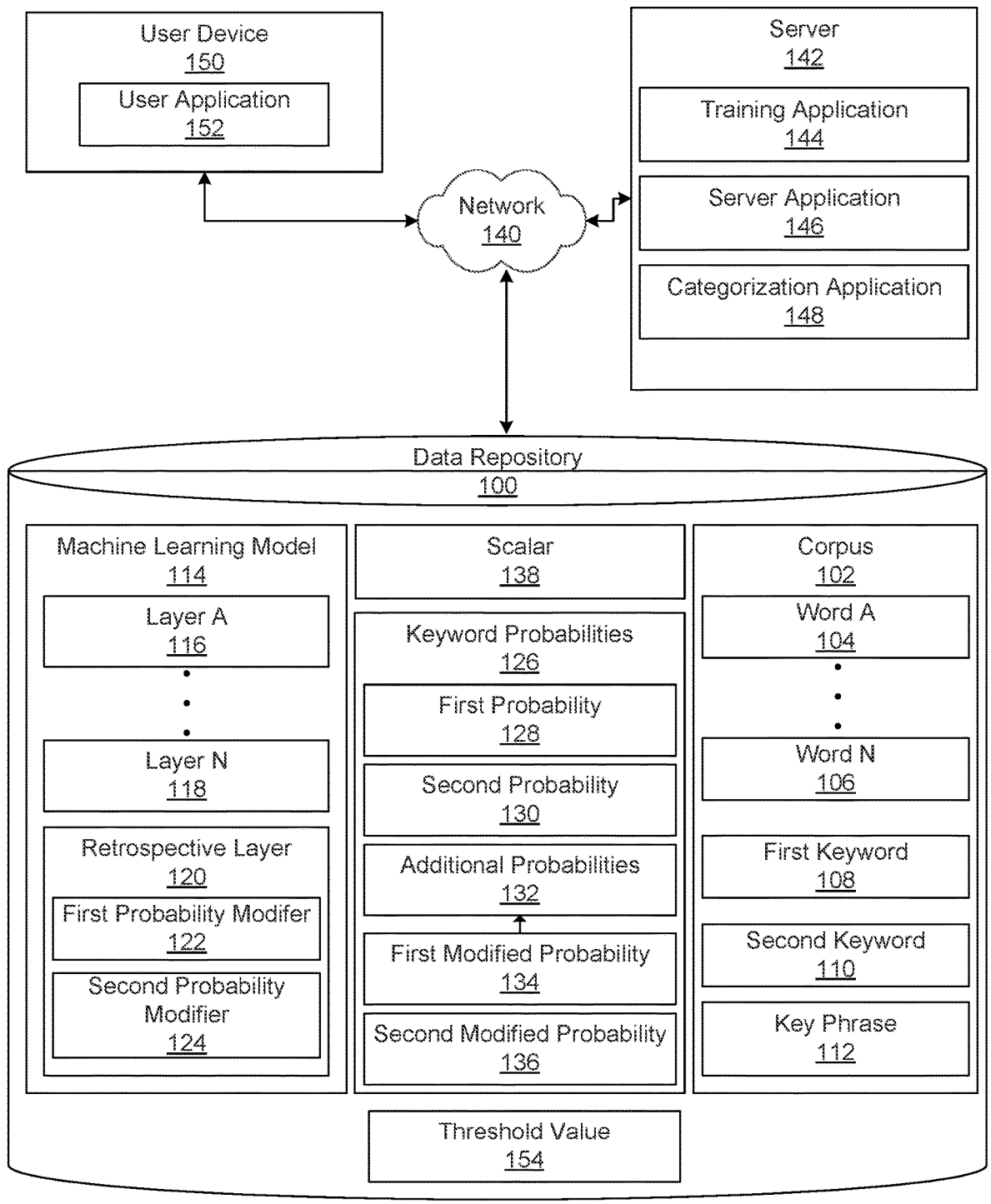
FIG. 1 shows a computing system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to improvements to the use and training of machine learning models to perform automatic, computerized key phrase extraction (AKE). AKE is useful for automatically identifying one or more key phrases within a corpus. In turn, the key phrases are useful for categorizing the corpus in some kind of categorization scheme, as well as for performing search engine optimization (SEO).

AKE is a sub-task within natural language processing, which, as used herein, is a computer processing function performed using machine learning models. However, AKE may result in key phrases that include superfluous words or words that do not, from a human reviewer's perspective, form a phrase that makes sense. For example, AKE might result in generating the key phrase "match batch withdrawals to" from a corpus. The word "to" in the phrase appears, to a human, to be the preposition in a missing prepositional phrase. Thus, the word "to" is superfluous and, accordingly, an undesirable word in a key phrase used for categorizing the corpus. For reference, a key phrase that contains only words that form grammatically correct, non-redundant, grammatically complete phrases may be referred-to as a "coherent" key phrase. The key phrase in the example immediately above is a non-coherent key phrase, because the example key phrase contains an incomplete prepositional phrase. The one or more embodiments provide for improved machine learning models and training that perform "coherent key phrase extraction."

The one or more embodiments provide for an improved machine learning model and an improved training of the machine learning model to improve AKE by preventing such superfluous words, or other undesirable words, from appearing within key phrases predicted by automatic natural language processing. The one or more embodiments also improve the likelihood that a relevant word that otherwise might be omitted from a key phrase, is instead added to the key phrase. The one or more embodiments address these technical challenges by providing for an additional, retrospective layer in the machine learning model.

In one or more embodiments, the retrospective layer is used to modify the predicted probability that a given word in the corpus is part of a key phrase. In particular, while the one or more embodiments use a number of layers in a deep learning machine learning model to predict a probability that the given word is in the key phrase, the one or more embodiments also use the retrospective layer to modify the initially predicted probability. The probability modification is determined based on the location of that first word relative to at least one neighbor word in the corpus. For example, in the above exemplary phrase, the fact that the word "batch" appears after the word "match" modifies the machine-learned probability that the word "batch" is a keyword in the key phrase. Similarly, the fact that the word "batch" appears before the word "withdrawals" will further modify the machine-learned probability that the word "batch" is a keyword in that key phrase. In other words, the improved machine learning model of the one or more embodiments is sensitive to the order (i.e. sequence) of words within the corpus when performing AKE. In this manner, the one or more embodiments provide for improved machine learning models and training that is capable of performing coherent key phrase extraction.

Turning to the system shown in FIG. 1, in one or more embodiments of the invention, the data repository (100) is any type of storage unit and/or device (e.g., a file system, database, collection of tables, or any other storage mechanism) for storing data. Further, the data repository (100) may include multiple different storage units and/or devices. The multiple different storage units and/or devices may or may not be of the same type or located at the same physical site.

The data repository (100) includes a corpus (102). As indicated above, a corpus (102) is defined as two or more natural language words in a single document. For example, the corpus (102) may include multiple words including Word A (104), Word N (106), and potentially many words in between, as indicated by the dashed line between Word A (104) and Word N (106). In this example, Word A (104) is a first word in the corpus (102) and Word N (106) is the last word in the example; however, either word may be any other word in the corpus (102) in other examples.

The corpus (102) includes both a first keyword (108) and a second keyword (110). Both keywords are selected from among the Word A (104) through the Word N (106) that form the corpus (102). A "keyword," as defined herein, is a word selected from the corpus (102) that is automatically identified as belonging to a key phrase, such as key phrase (112).

In turn, the key phrase (112) is defined as a sequence of one or more keywords that appear within the corpus in a particular order (i.e., sequence). Thus, the key phrase (112) may be characterized as being formed of a subset of words within the words that make up the corpus (102). For example, the key phrase (112) may be only the first keyword (108) or only the second keyword (110). However, the key phrase (112) may also be both the first keyword (108) and the second keyword (110). In an embodiment, the sequence of keywords that form the key phrase (112) is the same as the corresponding sequence of words that appears somewhere within the corpus (102). Thus, for example, if in the corpus (102) Word A (104) appears immediately before Word N (106), and both words are the only keywords that form the key phrase (112), then the key phrase (112) will be Word A (104) followed by Word N (106).

The data repository (100) also stores a machine learning model (114). The machine learning model (114) is a definition of a mathematical formula with a number of parameters (such as weights) that are to be learned from known data. Known data is data for which a known result is available. For example, if the corpus (102) is a corpus which has previously been parsed for key phrases that are known to be coherent, then the corpus (102) could be termed "known data." In turn, a known result is a known correspondence between data in the known data. For example, a "known result" may be that, after the machine learning model (114) has been used to perform automatic keyword extraction, a specific number of key phrases known to exist in the corpus (102) should have been identified by the machine learning model (114).

The machine learning model (114) may be one of several different kinds of deep learning or gradient-based machine learning models. "Deep learning" is, itself, a type of machine learning model. For example, the machine learning model (114) may be a neural network, a recurrent neural network (RNN), a conditional random field (CRF), or other kinds of deep learning networks. In a specific example, the machine learning model (114) is a bi-directional recurrent neural network which incorporates a conditional random field.

In any case, the machine learning model (114) includes multiple layers, from Layer A (116) to Layer N (118). The term "layer" is a term that applies to a collection of nodes operating together at a specific depth within a neural network. The first (top) layer may contain the raw data (such as the corpus (102)), and each variable may be considered a node. Deeper layers may be referred-to as "hidden layers", where each layer is programmed to learn different aspects about the data by minimizing an error or cost function. The output layer may be the last layer of the neural network, which outputs the results of the calculations in the hidden layers.

The dashed lines between Layer A (116) and Layer N (118) indicate the possibility of many layers being included in the machine learning model (114). During execution of the machine learning model (114), the layers are used to calculate a probability that any given word (such as Word A (104)) in the corpus (102) is a keyword (such as first keyword (108)) in a key phrase (such as key phrase (112)).

The one or more embodiments include a retrospective layer (120), which is one of the hidden layers established after the Layer A (116) through Layer N (118) which calculate the initial probabilities that given words are key words in key phrases defined by the Layer A (116) through Layer N (118). The details of the structure and operation of the machine learning model (114) are described more fully with respect to FIG. 4 and FIG. 5. Nevertheless, a summary of operational aspects of the machine learning model (114) is discussed in order to define other terms, such as but not limited to, the first probability modifier (122) and the second probability modifier (124).

The retrospective layer (120) is placed before the output layer in the machine learning model (114). The retrospective layer (120) is used to calculate a first probability modifier (122) which modifies a probability that a given word in the corpus (102) is a keyword in a key phrase. For example, Layer A (116) through Layer N (118) may calculate the probability that Word A (104) is the first keyword (108) in the key phrase (112); whereas the retrospective layer (120) calculates the first probability modifier (122) which is used to modify that probability. The first probability modifier (122) is based on where, in the sequence of words within the corpus (102), the particular word is located. Thus, the first probability modifier (122) may be based on the fact that Word A (104) appears before, or adjacent to, Word N (106) within the corpus (102).

The retrospective layer (120) may also calculate a second probability modifier (124), which is applied to the same particular word. In some cases, the word being considered comes before some other word in the sequence of words within the corpus (102). In other cases, the word being considered may be between two neighboring words in the sequence of words within the corpus (102). The second probability modifier (124) is calculated based on the fact that a word is located immediately after the word under consideration. Thus, for example, when calculating the probability that Word N (106) is the second keyword (110) in the key phrase (112), the second probability modifier (124) may be based on the fact that the Word N (106) comes after the Word A (104) in the corpus (102).

When the word under consideration is between two neighboring words, the first probability modifier (122) and the second probability modifier (124) may be both applied to the probability that the word under consideration is, for example, the second keyword (110) in the key phrase (112). In this manner, the retrospective layer (120) takes into account the specific sequence of words in the corpus (102) when determining whether any given word in the corpus (102) is a keyword in one of possibly many key phrases in the corpus (102). In particular, the machine learning model (114) translates the word embedding of each of the words in the corpus (102) at given position to a scalar (138). The retrospective layer (120) determines the first probability modifier (122) for at least one neighboring word using the scalar (138), as described further with respect to FIG. 4 and FIG. 5.

Thus, for example, the data repository (100) may store one or many keyword probabilities (126). Each of the keyword probabilities (126) corresponds to a particular probability that a particular word in the corpus (102) is a keyword belonging to a key phrase. Thus, for example, a first probability (128) may be calculated by the Layer A (116) that the Word A (104) is the first keyword (108) in the key phrase (112). Similarly, the second probability (130) may be that the Word N (106) is the second keyword (110) in the key phrase (112). The keyword probabilities (126) may contain some or potentially many different additional probabilities (132), each of which has been calculated for a respective different keyword.

Each of the keyword probabilities (126) are then modified according to the corresponding calculated probability modifiers calculated by the retrospective layer (120). Thus, for example, a first modified probability (134) may be the first probability (128) after the first probability modifier (122) has been applied. Similarly, a second modified probability (136) may be the second probability (130) after the second probability modifier (124) has been applied. Potentially many more probability modifiers may be calculated for respective ones of the additional probabilities (132).

The data repository (100) may be connected to various other sub-systems, possibly via a network (140). The network (140) may be, for example, network (720) of FIG. 7B.

Thus, for example, the data repository (100) may be in communication with a server (142). The server may be one or more computers possibly in a networked environment, such as computing device (700) in FIG. 7A.

The server (142) may execute a training application (144), a server application (146), and a categorization application (148). The training application (144) may be program code used to train the machine learning model (114), as explained with respect to FIG. 2 and FIG. 4. The training application (144) is configured to train the machine learning model using a corpus having known key phrases formed of known keywords. The training application (144) is further configured to train the machine learning model (144) prior to use.

Figure 3:
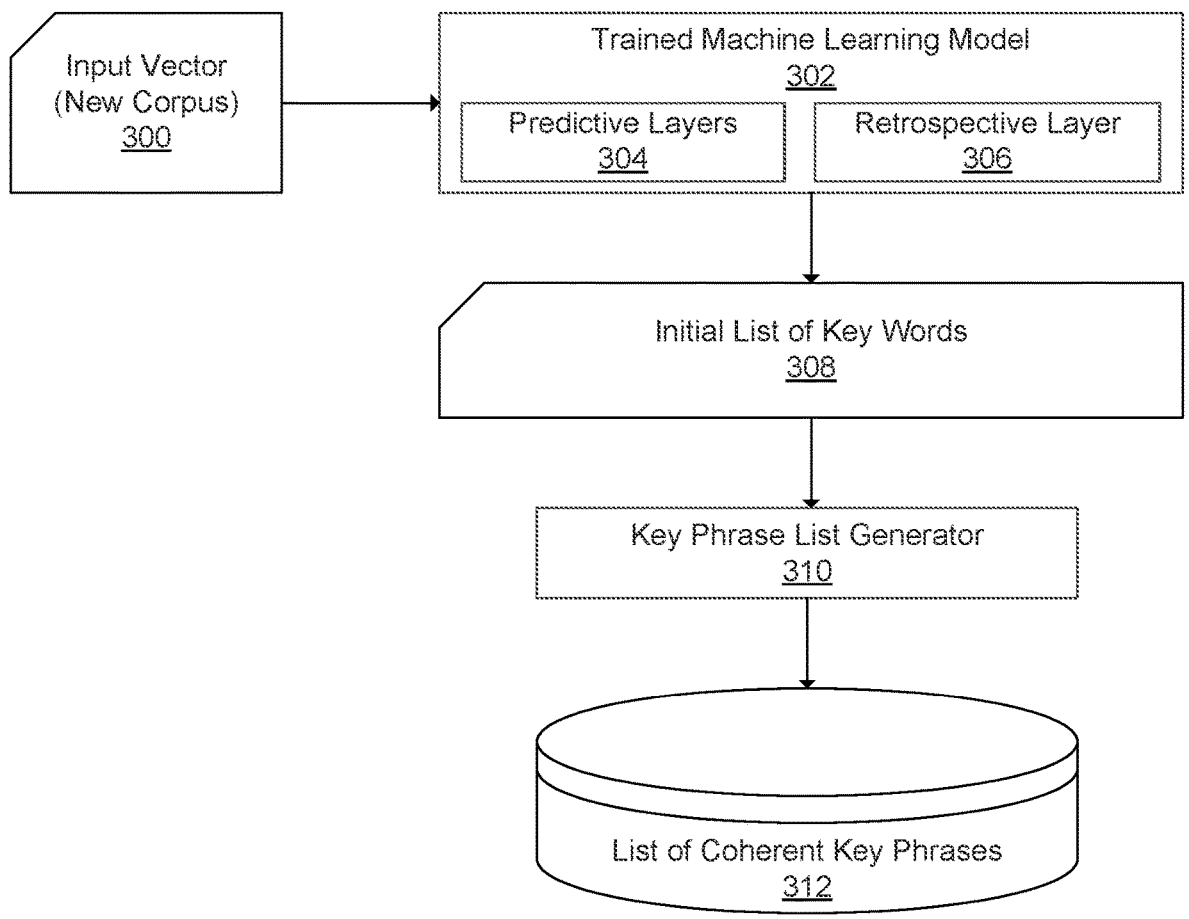
FIG. 3 shows an example of the server application in FIG. 1, in accordance with one or more embodiments of the invention.
Figure 5:
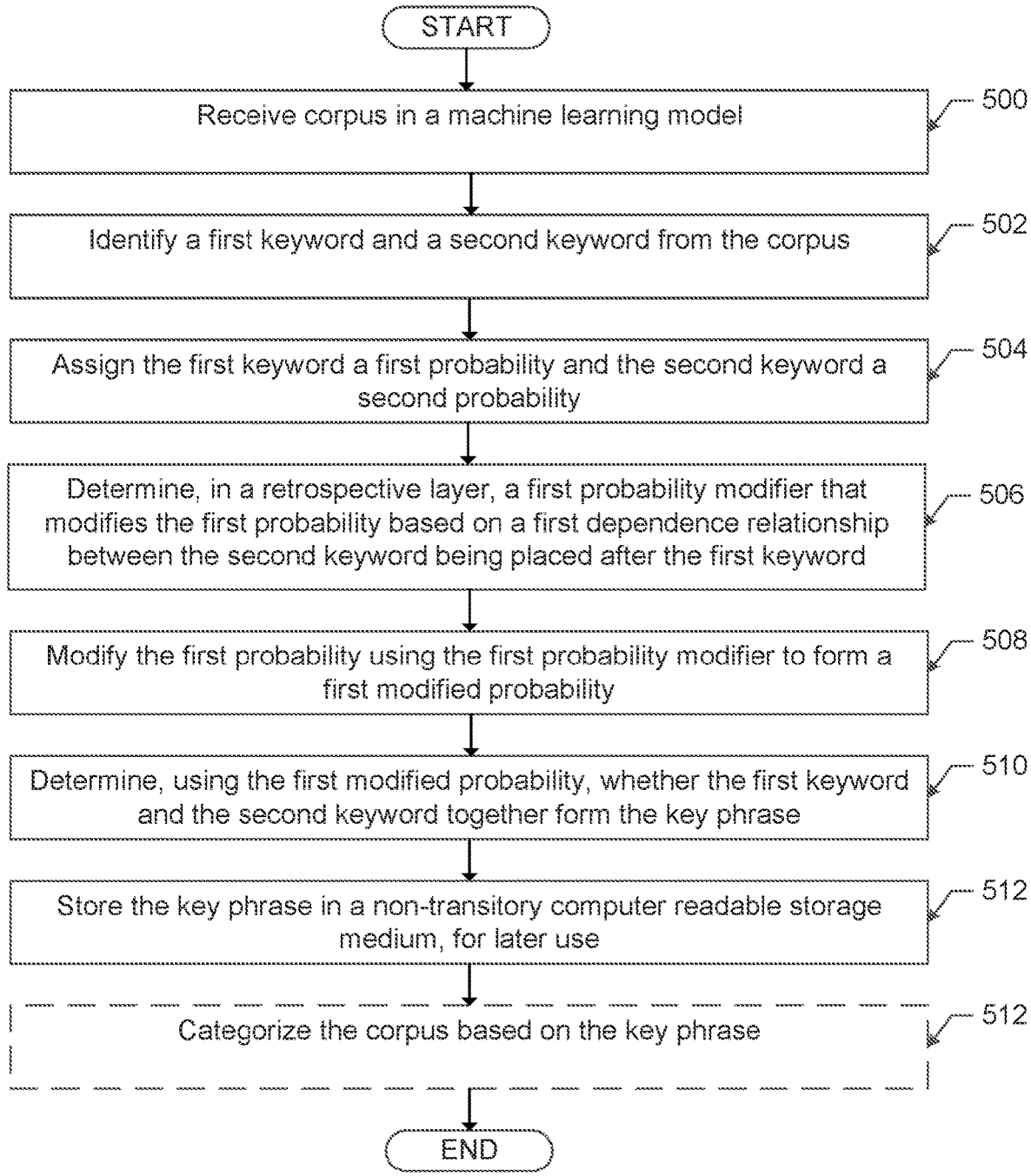
FIG. 5 is a flowchart of a method for using a machine learning model, in accordance with one or more embodiments of the invention.

The server application (146) may be program code used to execute the trained machine learning model, as explained with respect to FIG. 3 and FIG. 5. For example, the server application may be configured to predict that the Word A (104) is part of the key phrase (112) when the modified first modified probability (134) exceeds a threshold value (154) stored in the data repository (100). The categorization application (148) may be program code used to categorize the corpus (102) using, for example, the key phrase (112), as explained with respect to FIG. 5 and FIG. 6.

The system shown in FIG. 1 may also include a user device (150). The user device (150) may be in communication with the server application (146), possibly via the network (140). The user device (150) may be configured to search, using the key phrase (112), for the corpus (102) from among many possible documents. In other words, once the key phrase (112) has been generated, the user device (150) may be used to identify the corpus (102) from among many different documents using the key phrase (112) extracted using the automatic keyword extraction techniques described herein. A user application (152) executing on the user application (152) may be program code configured to execute the functions necessary to perform this action.

Figure 2:
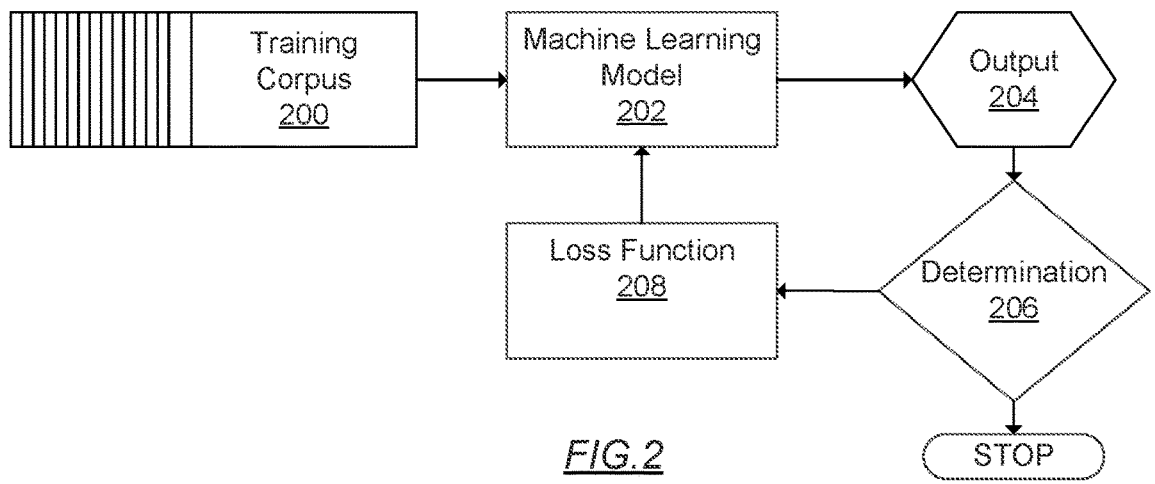
FIG. 2 shows an example of the training application in FIG. 1, in accordance with one or more embodiments of the invention.

Attention is now turned to FIG. 2, which illustrates a system for training the machine learning model (114) shown in FIG. 1. In machine learning, a machine learning model is fit to the known data in a process known as training. Once the machine learning model has been fit to the known data, then the machine learning model is ready for use with new data for which the result is not known ahead of time. Another example of training is described with respect to FIG. 5. FIG. 2, in particular, describes the process of training the machine learning model (114) in general terms, with the specific details of training the machine learning model (114) described with respect to FIG. 4. Use of the machine learning models presented herein is described with respect to FIG. 3 and FIG. 5.

Training begins by embedding a training corpus (200) into a vector. The training corpus (200) may be, for example, the corpus (102) in FIG. 1 when a set of known keywords formed into known key phrases is already available for the corpus (102). In other words, the software engineer already knows the result that the machine learning model (202) should predict, because the keywords and key phrases are already known for the training corpus (200). In turn, the vector is a matrix, sometimes a one-dimensional matrix composed of features. Each feature forms one element of the vector. Each feature may represent a word in the training corpus (200). Each feature may be represented by a number, termed the "value" for the feature.

The vector is provided to the machine learning model (202). The machine learning model (202) is a deep learning neural network, and may be the machine learning model (114) of FIG. 1, prior to use. The machine learning model (202) is executed by a processor, taking as input the training corpus (200). The result of execution of the machine learning model (202) is an output (204). The output (204) may be an output vector having feature values that correspond to certain words in the training corpus (200). The output vector, in this manner, represents the words from the training corpus (200) predicted to be keywords arranged into key phrases.

The output (204) is compared to the known result. Thus, for example, the output vector may be compared to the expected result. In other words, the predicted keywords and key phrases produced by the machine learning model (202) may be compared to the list of known keywords and known key phrases provided with the training corpus (200). The comparison may generate a numerical difference or a matrix of numerical differences between various features of the training corpus (200).

The difference may be expressed as a percentage of similarity between zero percent and one hundred percent. At zero percent, the predicted keywords and key phrases have no correspondence to the known keywords and known key phrases. At one hundred percent, the predicted keywords and key phrases correspond exactly to the known keywords and known key phrases. In most cases, achieving one hundred percent correspondence is impossible or impractical. Thus, a software engineer may set a threshold percentage when the result of the machine learning model (202) is considered "good enough" for the intended use of the machine learning model (202), as determined by the software engineer or by some automatically set rule.

Thus, a determination (206) is made whether the percentage of similarity between the predicted keywords and predicted key phrases and the known keywords and known key phrases exceeds the threshold percentage, such as but not limited to 98%. If the percentage of similarity is below the threshold percentage, then the training application will determine a loss function (208). The loss function (208) is a set of instructions to modify aspects of the machine learning model (202) in order to change how the machine learning model (202) performs mathematical operations on the training corpus (200). For example, the loss function (208) may change the weights of data or change certain mathematical functions in a neural network in order for the machine learning model (202) to produce a new output from the training corpus (200) that is closer in similarity to the known output.

The process described above iterates at each step until the output (204) diverges or converges. The output (204) is said to diverge when the difference described above does not exceed the set threshold percentage after a pre-specified number of iterations. The output (204) is said to converge when the difference described above exceeds the set threshold percentage. At either divergence or convergence, at determination (206), the process of training is stopped. If convergence was achieved, then the machine learning model (202) is considered trained and ready for use with an unknown corpus for which the keywords and key phrases are not known ahead of time. If divergence occurs, then the software engineer may select a new machine learning model which may be better suited for the particular task, may modify the machine learning model (202), or take some other action, and then repeat the training process again until convergence occurs or until the software engineer gives up or the software engineer lowers the threshold percentage so that convergence can occur.

Attention is now turned to FIG. 3, which describes the use of the machine learning model (114) described in FIG. 1, after training. Thus, it is assumed that the machine learning model (114) has been trained according to the process described with respect to FIG. 2, and possibly according to the detailed training procedures provided with respect to FIG. 4.

Initially, an input vector (300) is provided. The input vector (300) is composed of natural language words embedded as numerical values into the data structure of the input vector (300). The input vector (300) may be generated by a different machine learning natural language processing technique, not described herein, or by some other automatic generation process.

The input vector (300) is provided as input to the trained machine learning model (302). The trained machine learning model (302) includes predictive layers (304), such as Layer A (116) through Layer N (118) in FIG. 1, and a retrospective layer (304), such as retrospective layer (120) of FIG. 1. The predictive layers (304) predict, for each word (i.e., feature) in the input vector (300) a probability that the corresponding word is a key word in a key phrase. The retrospective layer (306) calculates a probability modifier for each corresponding probability. In particular, as described further with respect to FIG. 5, the retrospective layer (306) modifies the predicted probability for a given key word according to a position of the given key word relative to at least one neighboring keyword. In other words, the retrospective layer (306) takes into account the impact that the location of a word within a sequence of words has on the probability that the given word is a key word in a key phrase.

The trained machine learning model (302) then generates, as output, an initial list of key words (308) which might be formed into key phrases. Each of the key words is associated with a probability which has been modified by the retrospective layer (306).

Key phrases are then generated from the initial list of key words (308) via a key phrase list generator (310). In an embodiment, the key phrase list generator (310) may be part of the trained machine learning model (302) using the predictive layers (304). In other words, the trained machine learning model (302) itself predicts not only which words of the input vector (300) should be keywords, but also the organization of the keywords into a list of coherent key phrases (312). However, in FIG. 3, the key phrase list generator (310) is shown separately, because it is possible to use a different machine learning model or a set of rules to organize the initial list of key words (308) into the list of coherent key phrases (312). Thus, either the initial list of key words (308) or the list of coherent key phrases (312), or both, may be the ultimate output of the trained machine learning model (302).

While FIG. 1 through FIG. 3 show a configuration of components, other configurations may be used without departing from the scope of the invention. For example, various components may be combined to create a single component. As another example, the functionality performed by a single component may be performed by two or more components.

Figure 4:
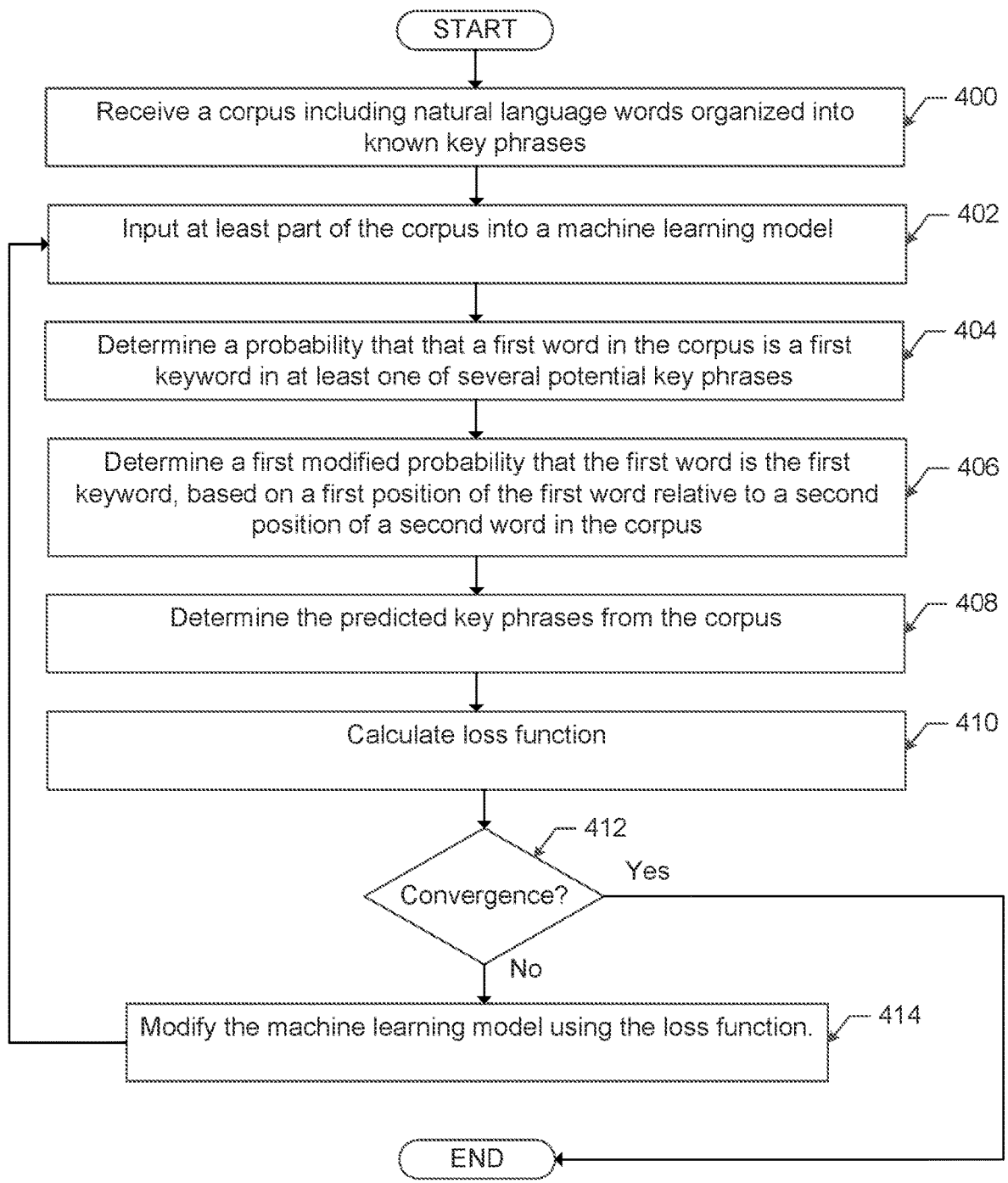
FIG. 4 is a flowchart of a method for training a machine learning model, in accordance with one or more embodiments of the invention.

Attention is now turned to FIG. 4, which provides a more detailed example of a method of training a machine learning model, such as machine learning model (114) in FIG. 1, relative to the method described with respect to FIG. 2. The method shown in FIG. 4 may be executed using the training application (144) executing the machine learning model (114) on the server (142), as described in FIG. 1.

At step 400, a corpus is received, the corpus including natural language words organized into known key phrases. Thus, the corpus may be referred to as an annotated corpus. The corpus may be received by a training application being executed by a processor.

At step 402, at least part of the corpus is input as a vector into a machine learning model. The machine learning model has several layers that perform automatic keyword identification and extraction, as well as a retrospective layer, described above. The corpus may be input as a vector by first embedding the corpus in the form of a vector. Embedding may be accomplished by another machine learning process or some other rule-based process, not described herein, which translates words in the corpus into numbers that form the values of the features in the vector.

At step 404, a probability is determined that a first word in the corpus is a first keyword in at least one of several predicted key phrases. The determination is performed by the initial layers in the machine learning model during execution of the machine learning model. The determination may be performed by assigning a probability, which may be expressed as a number between zero and one, to each of the features in the vector. Those probabilities that exceed a threshold value, such as but not limited to 0.5, may be marked as keywords. Thus, in this example, the first word is assigned a probability of at least 0.5, and thus is identified as a keyword in a predicted key phrase.

The key phrases are identified as those identified key words within the corpus that are consecutive with a prior keyword. In other words, if four consecutive features in the vector are identified as having a probability above the threshold, then all four words are identified as a single key phrase. Again, the key phrase may be as few as one word (i.e., the first keyword) and may be potentially any number of keywords to the limit of the corpus itself. Practically speaking, key phrases will usually be a short number of words, such as seven or fewer features in the vector.

Note that, in step 404, the first word in the corpus was identified as being a first keyword in at least one of several predicted key phrases. In other words, the first word could appear in multiple key phrases identified in the corpus. However, for this scenario to occur, the keyword appears in multiple locations within the corpus and is evaluated separately as being a keyword at each location. For example, assume the word "cat" (i.e. the animal) is determined to be a keyword in a first key phrase. Later, in a different sentence in the corpus, the word "cat" (i.e. the animal) is used again, and is also determined to be a keyword in a second key phrase. Thus, the same word appears as a keyword in multiple key phrases. However, a determination is not made that the word "cat" is always considered a keyword whenever the word "cat" appears in the corpus. Rather, the word "cat" happened to have a probability above a threshold in multiple locations within the corpus, and thus is identified as a keyword in multiple key phrases. Thus, in contrast, it is also possible that the same word, "cat," in some other portion of the corpus has an assigned probability below the threshold in a third sentence within the corpus. In this latter case, the word "cat" would not be added to a different key phrase that might be identified as existing within that third sentence in the corpus.

At step 406, a determination is made of a first modified probability that the first word is the first keyword, based on a first position of the first word relative to a second position of a second word in the corpus. The determination of the modified probability is performed by the retrospective layer, defined with respect to FIG. 1. The details of how the retrospective layer performs step 406 are now presented.

Again, the retrospective layer considers the dependency of each feature (i.e., word or token) in the vector on neighboring features (i.e., neighboring words or tokens). The consideration of neighboring feature dependency is first described conceptually, and then defined mathematically rigorously, below.

Take for example the word "of," which is a preposition. Note that, for purposes of calculations within the retrospective layer, the word "of" in this example is represented by a number as a feature in the vector. However, for purposes of this example and for ease of understanding, reference to the natural language word "of" is used here.

While the word "of" may be a part of a key phrase, due to the rules of grammar, the word "of" most likely will not start or end a key phrase. That is, if any of preceding or proceeding neighbors of the word "of" are predicted with a low keyword probability (i.e., a neighboring word with a probability below the threshold described above), then most likely the particular instance of the word "of" should not be a keyword as well.

Note that even if the underlying key phrase extraction algorithm uses a bi-directional recurrent neural network (RNN), which considers the context of each word, the problem of including this instance of the word "of" as a key phrase may still be prevalent. The problem exists even for bi-directional RNNs because the context is incorporated at an early stage within the neural network, that has not yet been translated into probabilities. Furthermore, also incorporating as part of the underlying machine learning model a conditional random field (CRF), which outputs the most probable sequence of keywords, also will not mitigate the problem. The reason is that the CRF considers only the probabilities without considering the different effect that any word may have on a neighboring word.

To this end, the one or more embodiments uses the retrospective layer, which retrospectively (i.e., after the first probability calculations) modifies the probabilities already calculated that a given word is a keyword. By retrospectively determining modified probabilities based on word order and word dependency, the one or more embodiments address the technical issues described above by sifting identified keywords that should not actually be keywords due to the rules of grammar in the natural language. For this reason, the key phrases that remain (i.e., consecutive sets of keywords) after application of the retrospective layer are coherent, as the extraneous words wrongly identified by the initial machine learning process as being keywords are sifted prior to being organized into key phrases by the machine learning model.

Attention is now turned to a mathematically rigorous description of how the retrospective layer operates within the machine learning model. Let $p_i$ be the predicted keyword probability of the token in position i within the vector. Because the purpose of the retrospective layer is to adjust the probabilities of at least tokens pairs associated with low-high probability values, then $p_i$ will be modified accordingly.

To this end, the retrospective layer learns, during training, the dependency level of each word on the preceding token. The same algorithm may be applied on the proceeding token, as well. The dependency level is calculated by training the machine learning model to translate the word embedding of each token at position i to a scalar $d\_i$. Thus, the word is embedded, using the retrospective layer, as a scalar. As explained below, the first modified probability may be determined using the retrospective layer using the scalar.

Next, a feature that considers the penalty due to the reliance on the preceding token is computed as follows:

$$pre\_i = f\_\alpha(d\_i*(1-p\_{i-1})+b),$$

where b is a learned bias term and $f\_\alpha()$ is the leaky rectified linear unit (ReLU) activation function, defined as: $f\_\alpha(x)=x$ if $x>0$, $\alpha*x$ otherwise, for some given \alpha.

Observe the value inside the function, "f( )". The function receives a higher score if the preceding probability $p\_{i-1}$ is low, that is, if the preceding token is not a keyword. Also the function is positively correlated with the dependency level of the token $d\_i$. Thus, $d\_i$ affects the magnitude of the value inside f( ).

The leaky ReLU activation function is used to create an asymmetric probability modifier. Positive values for the probability modifier have a significant impact on the modified probability, while negative values have a minor impact. Asymmetric treatment may be preferred because there should be a significant "punishment" to the probability of a word if that word depends on its neighbors. For example, if an identified keyword depends on its neighbors, then the high probability previously identifying the keyword will be significantly reduced. In other words, the value of the feature within the vector is substantially reduced in this case. As a result, the feature value is no longer over the threshold and, accordingly, the keyword will now not be identified as a keyword. Because the keyword is no longer considered a keyword (i.e., has a probability below the threshold), the keyword is sifted from the key phrase to which the keyword used to belong. However, there should be only a small increase if a word is dependent on the neighbors, and such a word will continue to receive a high probability due to a minor or no change to the probability assigned to the word.

In any case, after application of the leaky ReLU function, a probability modifier has been determined. Once the probability modifier has been determined, the probability of the keyword under consideration is modified using the probability modifier. Modifying the probability originally assigned to the keyword may be performed in one of several different ways. For example, the probability modifier may be multiplied, or possibly added, to the probability originally assigned to the potential keyword. Another mathematical process may also be used, such as to apply the following function to the potential keyword probability using the probability modifier:

$$p\_i <- p\_i + pre\_i * \omega^{\{pre\}}\_i$$

where $p\_i$ is the modified probability, $pre\_i$ is the original probability predicted for the feature at location i, and $\omega^{\{pre\}}\_i$ is a learned scalar. This process allows adjustment of the probability of a target token based on its neighbors' probabilities.

Figure 6:
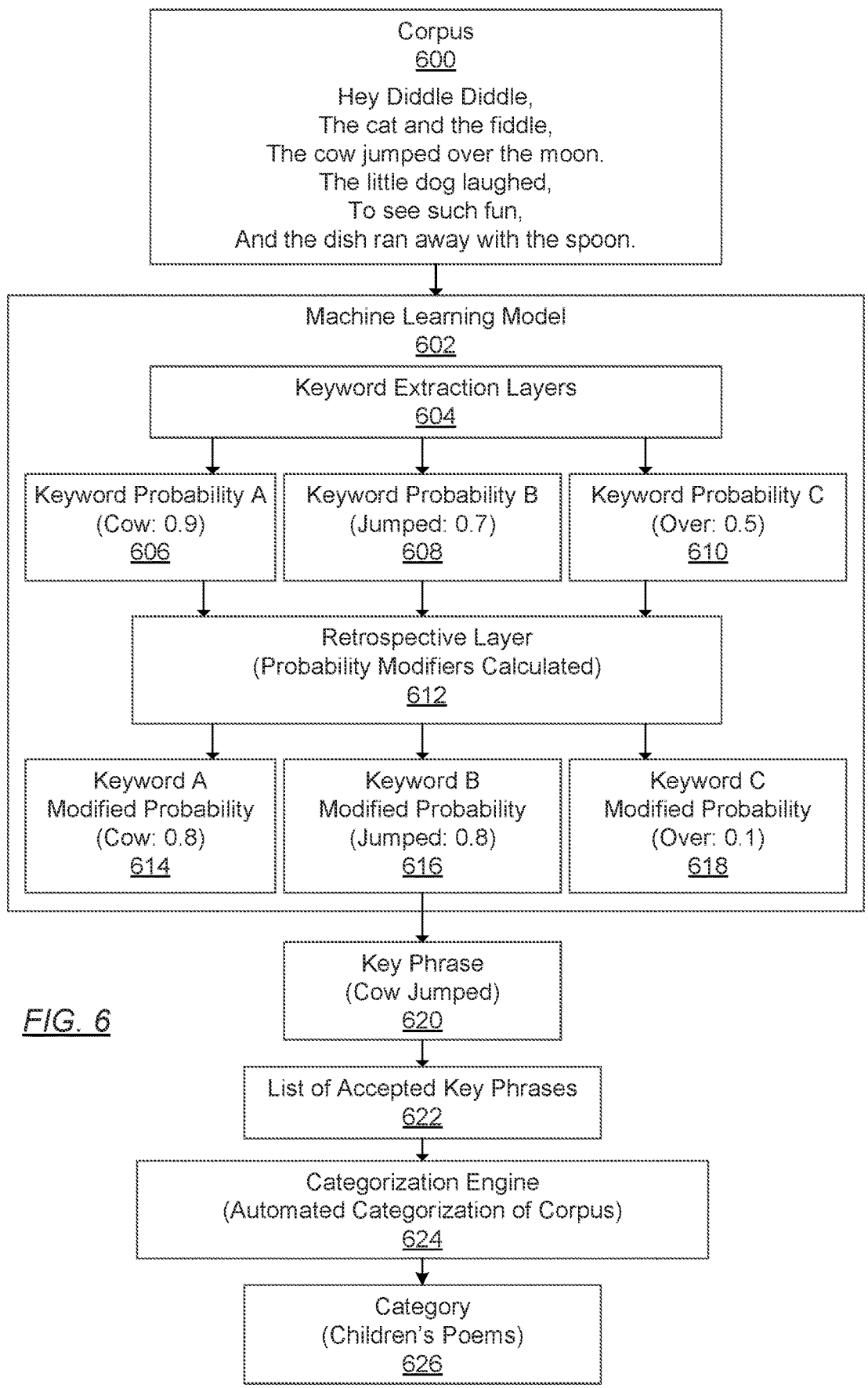
FIG. 6 shows an example of automatically categorizing a corpus, in accordance with one or more embodiments of the invention.

An example of the above process is provided in FIG. 6. Nevertheless, for a brief example, consider the non-coherent key phrase "match batch withdrawals to" in the example described above. The word "to" depends on a neighboring word that came after the word "to" in the corpus, such as the word "accounting" (i.e., the corpus stated, "match batch withdrawals to accounting.") The mathematical procedures performed in the retrospective layer punish the probability of the word "to" to an extent that the word "to," in this particular key phrase, is no longer above the threshold probability. As a result, the word "to" is no longer a keyword, and the key phrase (i.e., consecutive keywords) becomes "match batch withdrawals," which is a coherent key phrase, Thus, the one or more embodiments reduce or eliminate non-coherent key phrases, and thereby the overall automated keyword extraction process produces coherent key phrases.

Attention is now returned to FIG. 4. As a reminder, at step 406, the modified probability that the first word is the first keyword was determined. As a result, it is known whether the first word remains a keyword in the corpus (i.e., if the modified probability is still greater than the threshold probability). In this example, the first word has a probability that exceeds the threshold, and thus remains the first keyword.

Thus, at step 408, a determination of the predicted key phrases is made for the corpus. The machine learning model determines the predicted key phrases by linking together sets of consecutive keywords identified in the corpus. Thus, because the first keyword in this example remained a keyword, the first keyword in this example is part of at least one predicted key phrase. Note that the term "predicted key phrase" is used, because the key phrase is identified (or predicted) by the machine learning model.

At step 410, a loss function is calculated. The loss function is calculated by comparing and evaluating a difference between the plurality of predicted key phrases and the plurality of known key phrases. Specifically, the known key phrase may also have been embedded in a vector format. Thus, the vector representing the known key phrases may be mathematically compared to the predicted key phrases (which are also still embedded in a mathematical form when output by the machine learning model).

At step 412, a determination is made whether convergence has occurred. If convergence has not occurred (a "no" determination at step 412), then the process proceeds to step 414. Otherwise, if convergence has occurred (a "yes" determination at step 412, then the process terminates.

At step 414, the machine learning model is modified using the loss function. In the case of a deep learning model, such as a neural network, the machine learning model may be modified by adjusting the weights defined for the machine learning model. The machine learning model may also be modified by changing some other aspect of the mathematical functions defined within the machine learning model. Adjusting the machine learning model is performed automatically based on the loss function by predicting what changes to the weights and/or functions will result in a set of predicted key phrases that should more closely match the known key phrase. Thus, the machine learning model is adjusted using the loss function.

After modifying the machine learning model using the loss function at step 414, the process returns to step 402 (or alternatively to step 400) and repeats. The process continues to repeat until convergence has been achieved at step 412, whereupon the method of FIG. 4 terminates.

The method of FIG. 4 may be varied. For example, for simplicity, the example of FIG. 4 only refers to two words adjacent each other in the corpus. However, the retrospective layer may be further configured to determine the first modified probability also based on the first position of the first word relative to a third position of a third word in the corpus. In other words, both the preceding and the proceeding words of a potential keyword may modify the probability assigned to the potential keyword.

In another variation, a gradient descent process may be performed by mathematically maximizing cross entropy on the corpus. As a result, the pre-processed corpus may be optimized for performance of the method described in FIG. 4, and also of the method described in FIG. 5.

Attention is now turned to FIG. 5, which provides a more detailed example of a method of using a machine learning model, such as machine learning model (114) in FIG. 1, relative to the method described with respect to FIG. 3. The method shown in FIG. 5 is executed using a computer on a trained machine learning model, such as by using the server application (146) executing on the server (142) described in FIG. 1. The method of FIG. 5 is performed after training has been completed, such as the training method shown in FIG. 4.

At step 500, a corpus is received in the machine learning model. The corpus is received in the form of an embedded vector. The corpus may be a "new" corpus; i.e., a corpus for which the key phrases and key words are not known in advance. As with the method of FIG. 4, the corpus includes multiple words that are natural language terms. Also as with the method of FIG. 4, the machine learning model is a plurality of layers configured to extract a plurality of keywords out of the corpus and further includes a retrospective layer.

At step 502, a first keyword and a second keyword are identified from the corpus. The process of identifying a keyword is described above, with respect to FIG. 4.

At step 504, the first keyword is assigned a first probability and the second word is assigned a second probability. Each probability is a corresponding likelihood that a corresponding keyword is to be included in a key phrase. The process of assigning probabilities to keywords is described above, with respect to FIG. 4.

At step 506, a determination is made, in the retrospective layer, of a first probability modifier that modifies the first probability based on a first dependence relationship between the second keyword being placed after the first keyword. The process of determining the probability modifier is described above with respect to FIG. 4.

At step 508, the first probability is modified using the first probability modifier to form a first modified probability. The process of modifying the first probability is described above with respect to FIG. 4.

At step 510, the first modified probability is used to determine whether the first keyword and the second keyword together form the key phrase. The process of determining whether two or more keywords form part of a key phrase is described above with respect to FIG. 4.

At step 512, the key phrase is stored in a non-transitory computer readable storage medium, for later use. In one embodiment, the method of FIG. 5 may terminate.

The method of FIG. 5 may be modified or extended. For example, the key phrase stored in step 512 may be used in an optional step 514. At optional step 514, the corpus is categorized based on the key phrase.

In another variation, the probability modifier applied to the originally predicted probability of first key word may be further modified based on the positional relationship of the first key word relative to other words neighboring the first keyword (not necessarily just key words). Thus, for example, the method may include determining, in the retrospective layer, a second probability modifier that modifies the second probability based on a second dependence relationship between the first keyword being placed before the second keyword. In this case, the method may include modifying the second probability using the second probability modifier to form a second modified probability. Both the first modified probability and the second modified probability are then used to determine whether the first keyword and the second keyword together form the key phrase.

Yet further, the method may also include identifying, in the plurality of layers, a third word from the corpus. The third word is between the first word and the second word in a sequence of words defined in the corpus. In this case, the method also includes assigning the third keyword a third probability that is a corresponding likelihood that the third keyword is to be included in a key phrase. Then, a third probability modifier is determined in the retrospective layer. The third probability modifier modifies the third probability based on both of 1) a third dependence relationship between the third keyword being placed after the first keyword, and 2) a fourth dependence relationship between the third keyword being placed before the second keyword. In this case, the third probability is modified using the third probability modifier to form a third modified probability. Using the first modified probability and the second modified probability to determine whether the first keyword and the second keyword together form the key phrase also then includes additionally using the third modified probability in determining whether the first keyword, the second keyword, and the third keyword together form the key phrase.

Note that the probability modifiers in each case are "used" to determine the key phrase because the probability modifiers modify the determination of whether or not a particular word in the corpus is a keyword in the first place. Actual determination of the key phrase is performed by linking consecutively identified keywords as a set. Thus, while the probability modifiers are indeed used to determine the key phrase, the use is indirect through the determination of what words are keywords.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

The example of FIG. 6 is for explanatory purposes only and not intended to limit the scope of the one or more embodiments of the claimed inventions. The example of FIG. 6 may be implemented using the systems of FIG. 1 through FIG. 3 according to the methods described with respect to FIG. 5. Thus, in FIG. 6, the machine learning model (602) is a trained machine learning model, which was trained using the procedures described with respect to FIG. 4.

The corpus (600) is a children's poem written in natural language text, as presented in FIG. 6. Although not shown in FIG. 6, the corpus (600) has been embedded into a vector for use by the machine learning model (602), as described above.

Initially, the machine learning model (602) uses the keyword extraction layers (604) to calculate a corresponding probability for each word in the corpus (600) that the given word is a keyword. For purposes of this example, only the words "cow jumped over" are considered; however, each word in the corpus (600) will have an individual probability calculated and assigned by the keyword extraction layers (604).

In this example, three potential keywords and their probabilities are presented, as the Keyword Probability A (606), the Keyword Probability B (608), and the Keyword Probability C (610). The Keyword Probability A (606) is the word "cow" and the assigned probability of 0.9 (i.e., 90%). The Keyword Probability B (608) is the word "jumped" and the assigned probability of 0.7 (i.e., 70%). The Keyword Probability C (610) is the word "over" and the assigned probability of 0.5 (i.e., 50%).

In this example, the software engineer has determined that the threshold probability that the machine learning model (602) will accept a word as a keyword is 0.5. Thus, all three of Keyword Probability A (606), Keyword Probability B (608), and Keyword Probability C (610) are deemed to be keywords, because each probability is at least 0.5.

However, now the retrospective layers (612) (or a single retrospective layer) within the machine learning model is used to modify the originally calculated probabilities based on the position of the words "cow", "jumped", and "over" relative to each other within the corpus (600). Using the techniques described with respect to FIG. 5, the retrospective layers (612) calculate probability modifiers for each of the potential keywords identified as Keyword Probability A (606), Keyword Probability B (608), and Keyword Probability C (610). The probability modifiers are then mathematically applied to the Keyword Probability A (606), the Keyword Probability B (608), and the Keyword Probability C (610).

The result is three modified probabilities; namely, the Keyword A Modified Probability (614), the Keyword B Modified Probability (616), and the Keyword C Modified Probability (618). Due to the application of the probability modifiers, now the Keyword A Modified Probability (614) for the word "cow" is 0.8. While the probability has been reduced slightly, the probability remains higher than 0.5 Therefore, the word "cow" remains a keyword.

Similarly, the Keyword B Modified Probability (616) for the word "jumped" is now 0.8. In this case, the probability increased, though the increase is modest due to the application of the leaky ReLU rectifier function, as described with respect to FIG. 4. In any case, the Keyword B Modified Probability (616) remains at least 0.5, and thus the word "jumped" remains a keyword.

However, now the Keyword C Modified Probability (618) has been severely punished, reduced from 0.5 to 0.1. The reason is that the leaky ReLU rectifier function severely punished the original probability when the determination was made that the word "over" depends on the following word "the" in the corpus (600). Additionally, the depending word "the" is an article, and thus also associated with a low probability, as calculated by the keyword extraction layers (604). As a result, the probability modifier dramatically reduces the probability for the Keyword Probability C (610) of 0.5 to the Keyword C Modified Probability (618) of 0.1. Because the Keyword C Modified Probability (618) of 0.1 is less than the threshold of 0.5, the word "over" is no longer considered a keyword at that particular location within the corpus (600).

As described above, a key phrase is determined by grouping consecutive keywords together. In this case, the key phrase (620) is "cow jumped" because "cow" and "jump" are consecutive words in the corpus (600) and are also both predicted to be keyword. The key phrase (620) "cow jumped" is coherent, because the key phrase (620) does not include a preposition without a prepositional phrase, and is otherwise a grammatically correct phrase.

Thus, the key phrase (620) is added to the list of accepted key phrases (622). Other accepted key phrases may have been, for example, "Hey Diddle", "the cat and the fiddle", "the little dog laughed", "see such fun", "dish ran way", and "spoon".

The list of accepted key phrases (622) is then applied to the categorization engine (624). The categorization engine (624), again, is computerized rules and/or another machine learning model not described herein, which is configured for categorizing the corpus (600) according to the list of accepted key phrases (622).

In this case, the categorization engine (624) categorizes the corpus (600) as into a category (626). Namely, the categorization engine (624) categorizes the corpus (600) into the category of "children's poems."

The category (626) can then be used with respect to other processes not shown in FIG. 6. For example, the category (626) may be used to perform search engine optimization. In other words, because the corpus (600) has been automatically categorized, it will be easier for users using a search engine to find the children's poem entitled, "The Cat and the Fiddle," which is the corpus (600).

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 7A:
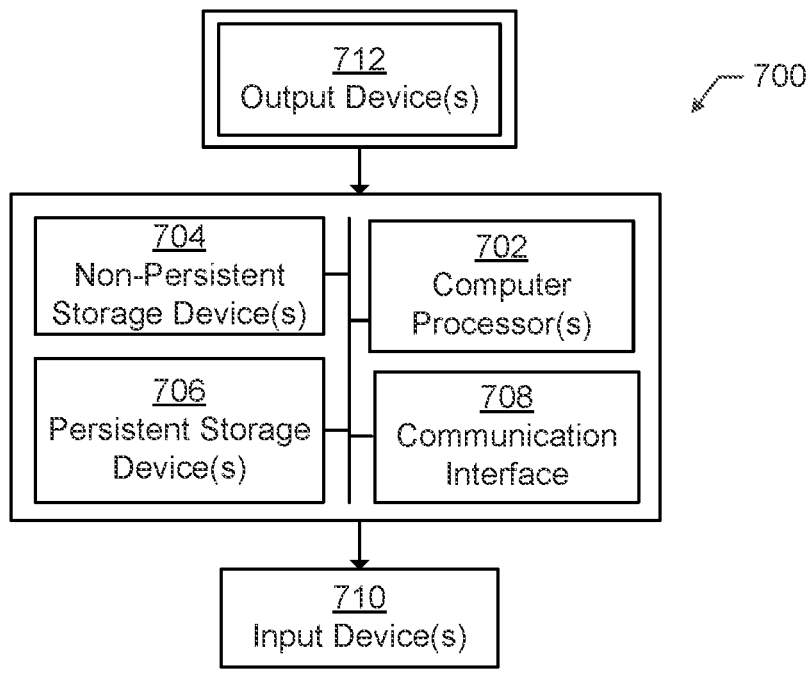
FIG. 7A and FIG. 7B show examples of a computing system and network, in accordance with one or more embodiments of the invention.

For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities that implement the features and elements of the disclosure.

The computer processor(s) (702) may be an integrated circuit for processing instructions. For example, the computer processor(s) (702) may be one or more cores or micro-cores of a processor. The computing system (700) may also include one or more input devices (710), such as a touchscreen, keyboard, mouse, microphone, touchpad, electronic pen, or any other type of input device.

The communication interface (708) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (712), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage device (s) (704), and persistent storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
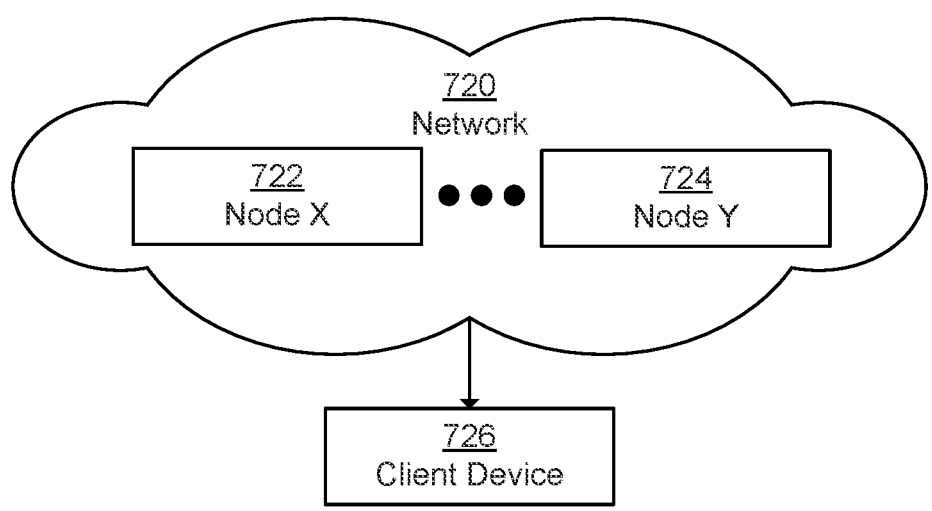

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system (700) shown in FIG. 7A, or a group of nodes combined may correspond to the computing system (700) shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system (700) shown in FIG. 7A. Further, the client device (726) may include and/or perform all or a portion of one or more embodiments of the invention.

The computing system (700) or group of computing systems described in FIG. 7A and FIG. 7B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different applications and may execute on the same or different computing systems.

Rather than or in addition to sharing data between processes, the computing system (700) performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system (700), in performing one or more embodiments of the invention, may extract one or more data items from the obtained data. For example, the extraction may be performed as follows by the computing system (700) in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system (700). For example, the computing system (700) of FIG. 7A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (700) in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others.

The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (700) of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system (700). For example, data may be presented to a user using a vibration generated by a handheld computer device with a predefined duration and intensity of the vibration to communicate the data.

The above description of functions presents only a few examples of functions performed by the computing system (700) of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
  receiving, in a machine learning model, a corpus comprising a plurality of words comprising natural language terms, wherein the machine learning model comprises a plurality of layers configured to extract a plurality of keywords out of the corpus and further comprises a retrospective layer;
  identifying, in the plurality of layers, a first keyword from the corpus and a second keyword from the corpus;
  assigning the first keyword a first probability and the second keyword a second probability, wherein each probability is a corresponding likelihood that a corresponding keyword is to be included in a key phrase;
  determining, in the retrospective layer, a first probability modifier that modifies the first probability based on a first dependence relationship between the second keyword being placed after the first keyword,
    wherein the first probability modifier punishes the first keyword when the first keyword depends on the second keyword and the second keyword comes after the first keyword in the corpus, and
    wherein punishes comprises reducing a probability that the first keyword is in the key phrase;
  modifying the first probability using the first probability modifier to form a first modified probability;
  using the first modified probability to determine whether the first keyword and the second keyword together form the key phrase; and
  storing the key phrase in a non-transitory computer readable storage medium.

2. The method of claim 1, further comprising:
  categorizing the corpus based on the key phrase.

3. The method of claim 1, wherein determining, in the retrospective layer, the first probability modifier further comprises:
  embedding, using the retrospective layer, the second keyword as a scalar;
  determining, using the retrospective layer, the first probability modifier for the second keyword using the scalar.

4. The method of claim 3, wherein determining the first probability modifier using the scalar comprises using the scalar in a leaky rectifier function.

5. The method of claim 1, further comprising:
  recursively iterating:
    identifying the first keyword and the second keyword, assigning the first keyword the first probability and the second keyword the second probability, determining the first probability modifier and a second probability modifier, modifying the first probability and the second probability, and using the first modified probability and a second modified probability to determine whether the first keyword and the second keyword together form the key phrase,
  until convergence of the machine learning model.

6. The method of claim 5, further comprising:
  identifying, in the plurality of layers, a third keyword from the corpus, wherein the third keyword is between the first keyword and the second keyword in a sequence of words defined in the corpus;
  assigning the third keyword a third probability comprising a corresponding likelihood that the third keyword is to be included in a key phrase;
  determining, in the retrospective layer, a third probability modifier that modifies the third probability based on both of i) a third dependence relationship between the third keyword being placed after the first keyword, and ii) a fourth dependence relationship between the third keyword being placed before the second keyword;
  modifying the third probability using the third probability modifier to form a third modified probability; and
  wherein using the first modified probability and the second modified probability to determine whether the first keyword and the second keyword together form the key phrase further comprises additionally using the third modified probability in determining whether the first keyword, the second keyword, and the third keyword together form the key phrase.

7. The method of claim 1, further comprising:
using a gradient descent process by mathematically maximizing cross entropy on the corpus.

8. A method of training a machine learning model, comprising:
receiving a corpus comprising a plurality of natural language words, wherein the plurality of natural language words are organized into a plurality of known key phrases;
inputting at least part of the corpus as a vector into the machine learning model, wherein the machine learning model comprises a plurality of layers and a retrospective layer,
determining, using the plurality of layers, a probability that a first word in the corpus is a first keyword in at least one of a plurality of predicted key phrases,
determining, using the retrospective layer, a first modified probability that the first word is the first keyword based on a first position of the first word relative to a second position of a second word in the corpus,
wherein the first modified probability punishes the first word when the first word depends on the second word and the second word comes after the first word, and
wherein punishes comprises reducing a probability that the first word is in the predicted key phrases;
determining, using the machine learning model, the plurality of predicted key phrases, wherein at least one of the plurality of predicted key phrases comprises at least the first word;
calculating a loss function by comparing and evaluating a difference between the plurality of predicted key phrases and the plurality of known key phrases; and
modifying the machine learning model using the loss function.

9. The method of claim 8, wherein determining the first modified probability further comprises:
embedding, using the retrospective layer, the second word as a scalar;
determining, using the retrospective layer, the first modified probability using the scalar.

10. The method of claim 9, wherein determining the first modified probability using the scalar further comprises using the scalar in a leaky rectifier function.

11. The method of claim 8, further comprising:
wherein the retrospective layer is further configured to determine the first modified probability also based on the first position of the first word relative to a third position of a third word in the corpus.

12. The method of claim 8, further comprising:
recursively iterating:
inputting at least part of the corpus, determining the probability that the first word in the corpus is the first keyword, determining the first modified probability, predicting the plurality of predicted key phrases, calculating the loss function, and modifying the machine learning model,
until convergence of the machine learning model.

13. The method of claim 8, further comprising:
using a gradient descent process by mathematically maximizing cross entropy on the corpus.

14. A classification system comprising:
a data repository storing:
a corpus comprising a plurality of words including a first word;
a machine learning model comprising a plurality of layers and a retrospective layer,
a key phrase comprising a subset of words within the plurality of words,
a first probability that the first word is a first keyword in the key phrase, and
a modified probability that the first word is the first keyword, wherein:
the modified probability is based on a first position of the first word relative to at least one neighbor word in the corpus,
wherein the modified probability punishes the first word when the first word depends on the at least one neighbor word and the at least one neighbor word comes after the first word, and
wherein punishes comprises reducing a probability that the first word is in the key phrase; and
a server comprising a server application, wherein:
the server application is configured to execute the machine learning model to calculate the first probability using the plurality of layers and to calculate the modified probability using the retrospective layer, and
the server application is further application is further configured to predict that the first word is part of the key phrase when the modified probability exceeds a threshold value.

15. The classification system of claim 14, further comprising:
a categorization application configured to categorize the corpus using the key phrase.

16. The classification system of claim 14, further comprising:
a training application configured to train the machine learning model,
wherein the corpus further comprises a plurality of known key phrases comprising a plurality of known keywords, and
wherein the training application is further configured to train the machine learning model prior to use of the machine learning model by:
inputting at least part of the corpus as a vector into the machine learning model,
determining, using the plurality of layers, the first probability that the first word in the corpus is the first keyword in at least one of a plurality of predicted key phrases,
determining, using the retrospective layer, a modified probability that the first word is the first keyword based on the first position of the first word relative to a second position of the at least one neighbor word in the corpus,
predicting, using the machine learning model, the plurality of predicted key phrases, wherein at least one of the plurality of predicted key phrases comprises at least the first word,
calculating a loss function by comparing and evaluating a difference between the plurality of predicted key phrases and the plurality of known key phrases, and
modifying the machine learning model using the loss function.

17. The classification system of claim 14, further comprising:

a user device in communication with the server application and configured to search, using the key phrase, for the corpus from among a plurality of documents.

18. The classification system of claim 14, wherein the server application is further configured to execute the machine learning model to calculate the first probability by:
  embedding, using the retrospective layer, the at least one neighboring word as a scalar, and
  determining, using the retrospective layer, a first probability modifier for the at least one neighboring word using the scalar in a leaky rectifier function.

* * * * *